April 21, 1931.  E. W. HUKILL ET AL  1,801,961

COLLAPSIBLE DECOY

Filed March 29, 1928

INVENTORS
Earl W. Hukill &
Charles A. Braunger,
BY Morsell, Keeney & Morsell
ATTORNEYS Patented Apr. 21, 1931

1,801,961

UNITED STATES PATENT OFFICE

EARL W. HUKILL AND CHARLES A. BRAUNGER, OF MILWAUKEE, WISCONSIN; SAID BRAUNGER ASSIGNOR TO SAID HUKILL

COLLAPSIBLE DECOY

Application filed March 29, 1928. Serial No. 265,751.

This invention relates to improvements in collapsible decoys, and more particularly to a light decoy duck which may be collapsed to occupy a minimum amount of space for transportation and storage.

Decoys now in general use are of a solid wood construction and are therefore bulky and heavy and inconvenient to transport from place to place.

It is the primary object of the present invention to overcome the above objection by providing a decoy duck formed of a light, two-part separable shell detachably mounted on a float, this arrangement permitting the separation of the shell sections of a plurality of decoys and the stacking of one within the other for convenience in handling and to save space.

A further object of the invention is to provide a collapsible decoy which may be very quickly and easily assembled or disassembled.

A further object of the invention is to provide a decoy which, if struck by shot, will not sink.

A further object of the invention is to provide a collapsible decoy which is of very simple construction, is inexpensive to manufacture, is strong and durable, and is well adapted for the purposes described.

With the above and other objects in view, the invention consists of the improved collapsible decoy and its parts and combinations as set forth in the claim, and all equivalents thereof.

In the accompanying drawing in which the same reference characters indicate the same parts in all of the views.

Figure 1:
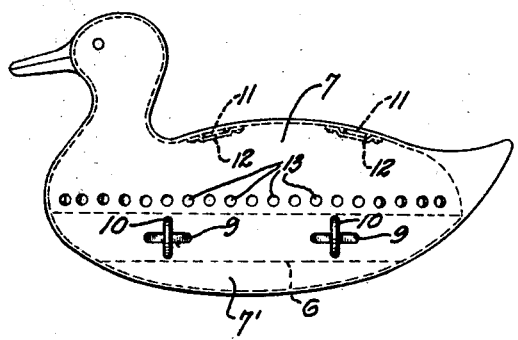
Fig. 1 is a side view of the improved collapsible decoy duck.
Figure 2:
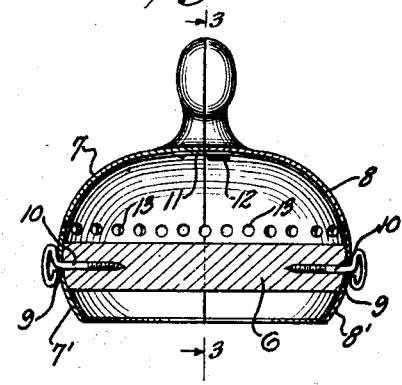
Fig. 2 is a cross-sectional view thereof.
Figure 3:
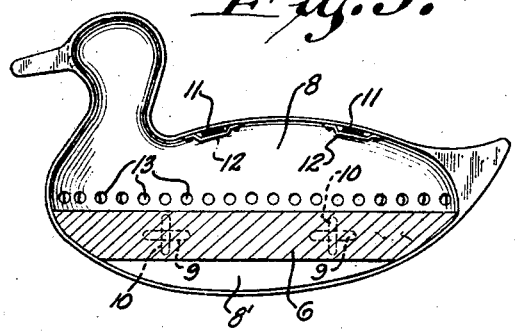
Fig. 3 is a view taken on line 3—3 of Fig. 2.
Figure 4:
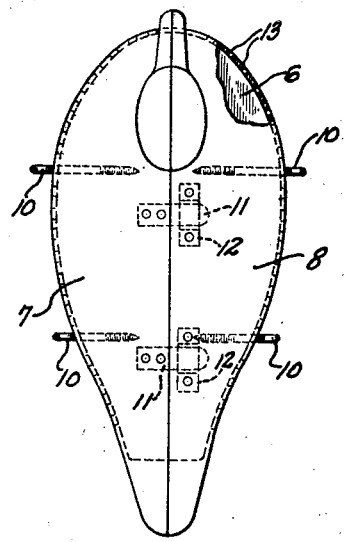
Fig. 4 is a plan view of the decoy, a portion being broken away and shown in section.

Referring now more particularly to the drawing, it will appear that the numeral 6 indicates a float member formed of wood, cork or any other suitable buoyant material and shaped as shown in Fig. 4, with a rounded front end portion and a reduced or tapered rear end portion.

Detachably secured to opposite side edges of the float member 6 are a pair of complementary half sections 7 and 8 of dished or concave formation, with their outer surfaces suitably painted or enameled to represent a duck or fowl, and preferably formed of aluminum or a similar light metal. The major portions of said half sections 7 and 8 extend upwardly from the float, but there are depending portions 7' and 8' which cover and conceal the float member.

The portions of the half sections which are in engagement with the side portions of the float member are provided with spaced-apart elongated openings 9 and the shank portion of an eye-screw 10 is extended through each opening 9 and is threaded into the float member 6. Normally, the heads of the screws 10 are turned at right angles to the openings 9 and in this manner the half sections are detachably secured to the float member.

The upper edge portions of the half sections 7 and 8 are detachably held together at their line of juncture by means of tongues 11 and straps 12. The tongues project from the under-surface of one section, as 7, and enter the straps formed on the under-surface of the other section 8.

The half sections 7 and 8 are further formed with a line of spaced apertures 13 above the float member for the purpose of providing an outlet for water should it get into the space between the sections and the float member.

It is obvious that the decoy is both light and buoyant and will not be caused to sink should it be struck by a missile. In practice, a dozen or more decoys are usually taken by a hunter and the present decoys may be readily disassembled for convenient handling and so as to occupy a minimum amount of space. To separate the units of each decoy it is merely necessary to turn the screws 10 so that their head portions are parallel with the elongated openings 9. Then the sections 7 and 8 may be removed from the float member and the engaging tongues and straps of the sections are also parted to separate the sections. A plurality of half-sections may be stacked one within the other and also a plurality of float members may be stacked together.

From the foregoing description, it will be seen that the improved collapsible decoy is of simple and novel construction, and is well adapted for the purposes set forth.

What is claimed as the invention is:

A decoy, comprising a pair of complementary dished, metallic sections, complementary means on the upper edge portions of said sections for releasably joining the same, said sections forming a shell-like body member, and a float member within the lower portion of the body member and positioned above the lowermost edge portions of the body member, and means for detachably connecting the body member to said float, said float member being concealed by said body member.

In testimony whereof, we affix our signatures.

EARL W. HUKILL.
CHARLES A. BRAUNGER.